United States Patent [19]
Jackson

[11] 3,780,452
[45] Dec. 25, 1973

[54] METHOD FOR MOUNTING AND PRESERVING ANIMALS WITHOUT EVISCERATION

[75] Inventor: William D. Jackson, Brownwood, Tex.

[73] Assignee: R. Ray Rankin, Brownwood, Tex. ; by said Jackson and Bell, a part interest

[22] Filed: May 28, 1971

[21] Appl. No.: 147,879

[52] U.S. Cl. ................................. 35/20, 8/94.11
[51] Int. Cl. ................................. G09b 23/36
[58] Field of Search ................ 35/20; 8/94.11; 117/3; 27/22 R, 22 A

[56] References Cited
UNITED STATES PATENTS

| | | | |
|---|---|---|---|
| 44,495 | 9/1864 | Morgan | 27/22 R |
| 220,103 | 9/1879 | Wickersheimer | 27/22 A |
| 1,554,641 | 9/1925 | Miner | 8/94.11 |
| R19,099 | 3/1934 | Haabestad | 27/22 A |

OTHER PUBLICATIONS

"Science", Vol. 82, No. 2134, page 498, Nov. 22, 1935.

C. S. Barnes, "The Art & Science of Embalming" 9th Edition, 1906, pp. 374, 377, 378, 379 only.

"Directions for Collecting, Preserving, and Shipping Fishes" Smithsonian Publication Sil-80 rev. pp. 1,2,3 only June 1961.

*Primary Examiner*—Harland S. Skogquist
*Attorney*—Richards, Harris & Hubbard

[57] ABSTRACT

A method for preserving and hardening animals for display includes the steps of injecting the animal with a preservative solution and a setting agent. No evisceration or other preparation except washing and sealing of wound openings is needed. The preservative solution includes an aqueous formaldehyde solution, a formalin neutralizer, a mold inhibitor, and odorant, and a drying agent. The setting agent includes calcium sulfate, sodium chloride, and water. The preservative solution and setting agent are injected into the animal body beginning near the midsection thereof and advancing outwardly toward the extremities of the animal. The procedure is periodically repeated.

10 Claims, 8 Drawing Figures

PATENTED DEC 25 1973 3,780,452

INVENTOR:
WILLIAM D. JACKSON

Richards, Harris & Hubbard
ATTORNEYS 3,780,452

METHOD FOR MOUNTING AND PRESERVING ANIMALS WITHOUT EVISCERATION

BACKGROUND OF THE INVENTION

This invention relates to animal preservation and more particularly to the preservation of animals for display without evisceration.

Conventional taxidermy techniques usually involve skinning or dehiding of an animal, especially fur-bearing animals, tanning the hide or preserving it in some other conventional manner, and remounting the preserved hide on a suitable form such as one constructed from paper mache or wood. The skin and form can then be appropriately mounted on a display platform as desired.

The prior art taxidermy techniques are expensive and time consuming. For example, for a given animal a special mold must be prepared to insure a proper fit of the skin to a final form. A rather large amount of skill and artistic ability is required to make the skin appear lifelike on the form. Additionally, prior art taxidermy techniques utilize rather dangerous chemicals, for example, the acids used in the tanning process.

Other techniques have been previously utilized to prepare and preserve animals for academic use. In one such technique, the skin of the animal is removed, dried and stuffed with cotton. In a second technique, the entire body of the animal is injected with formalin. Such prior art techniques are not suitable for practice by an amateur, nor are they particularly suited for educational, craft or home use where lifelike final appearance is desired. These skins are prepared for purposes of study and handling. No attempt is made to make them appear life-like.

SUMMARY OF THE INVENTION

The present invention therefore provides a method for preserving the body of a dead animal without evisceration, skinning, tanning or preparation of an animal form and remounting of the skin on the form. The method for preserving an animal body comprises injecting a preservative solution into the body of an animal before substantial decadent bacterial action has begun, and injecting a setting agent into said body to stiffen and form said body. The injection of a preservative and a setting agent is repeated until the animal body has assumed the proper form and has become sufficiently hard and stiff to support itself.

A method of mounting artificial eyes in an animal body being preserved comprises combining potters clay with absorbent cotton to form a spongy mass the size of the eye socket in said body, positioning the mass in the eye socket and inserting the artificial eye in the socket. A method for preserving the ears of an animal comprises supporting the ears on a tailored form, drying the ears, and removing the form.

The preservative solution utilized for preserving whole dead animal tissue is composed of an aqueous formaldehyde solution, a formalin neutralizer, a lower aliphatic alcohol, an odorant, and a mold inhibitor. These ingredients along with an appropriate syringe can be packaged in kit form for use by an individual to preserve animals of his choosing.

BRIEF DESCRIPTION OF THE DRAWINGS

The invention will be better understood by reading the ensuing specification in conjunction with the accompanying drawings, wherein.

DETAILED DESCRIPTION OF THE INVENTION

In a preferred embodiment, the present invention relates to the preservation and mounting of game animals and other specimens for display. These animals may be obtained in several ways, such as by live trapping or by conventional firearm hunting techniques. It is preferred that a freshly killed animal be utilized for practice of the present invention. A live animal can be trapped and then gassed with chloroform or otherwise humanely killed. As used herein, the term animal refers generally to mammals, birds, reptiles, amphibians and fish.

If an animal is killed with a firearm, the animal should not be shot in the head as head wounds are difficult to repair. Care should also be exercised in the choice of weapons and range at which the animal is shot to prevent material disintegration of body tissue. A wound administered with a firearm should be as clean and small as possible to facilitate repair when preserving the animal.

If it is not possible to work with an animal immediately after it has been killed, it can be temporarily preserved by freezing. Before freezing, the specimen should be washed with a shampoo to remove all blood, debris and parasites. The animal then can be wrapped in a plastic bag or other substantially air-tight container, sealed, and frozen until it can be preserved in accord with the invention. Animals can be frozen for at least up to three months and thereafter successfully preserved by the method of the present invention.

If the ears of an animal to be frozen are relatively large, such as those of a deer, they must be partially prepared before freezing. In order to prepare the ears for freezing, a form is made as explained in conjunction with FIGS. 4 and 5. This will prevent excessive wrinkling and damage to the ears while the animal is frozen.

The present invention can be practiced in a relatively short period of time. In accord with a preferred embodiment, a small animal the size of a squirrel can be preserved and mounted in a matter of 3 to 5 days working with the animal approximately one hour each day, drying time not included.

After the specimen is selected and has been cleaned, the body if killed with a firearm, should be examined for wounds. Wounds are repaired by first pulling the hair away from the injured tissue and cutting away the damaged edge of the entrance and exit hole. Care must be taken not to cut away any hair. Colored sewing thread which will blend with the hair colors of the particular specimen can be used to stitch the wound tightly closed. Thereafter, the hair can be combed back over the stitched area to hide the repair.

A preferred embodiment of the invention will be described in relation to the preservation of a small animal such as a squirrel. The first step in preserving an animal is a series of procedures. Immediately prior to beginning the preservation technique, the animal should be washed with shampoo. If the animal was frozen, it should be completely thawed and rewashed.

Figure 1:
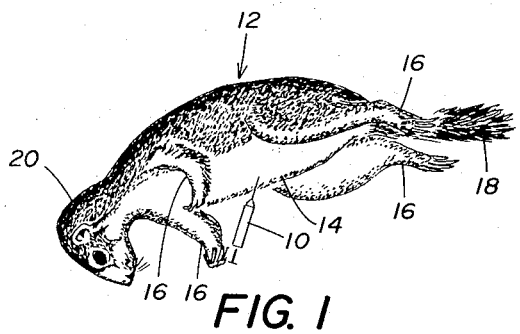
FIG. 1 is a view of initial injections made to an animal as part of the preservation technique of the present invention.

A preservation solution is then injected into the animal, completely saturating the animal therewith. A 10 cc. veterinary syringe with an 18 or 16 gauge needle has been found to be adequate for injection of the preservative solution. Injections are begun in the midsection of the animal 12 as shown in FIG. 1. A syringe 10 is percutaneously and permuscularly inserted into the abdominal region 14 of the animal. Successive injections are made advancing from the midsection toward each end of the animal. Injections must also be administered to the tissue of the legs 16, the tail 18 and head 20.

The animal should be thoroughly saturated with preservative solution. Saturation is insured when the solution is flowing from all body openings and the skin exterior is wet with the solution. The ears should not be injected with the preservative solution for reasons set forth below, but should be treated as described below.

Figure 2:
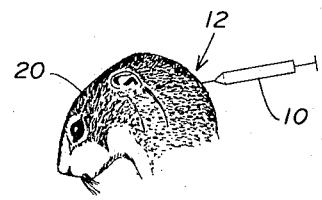
FIG. 2 is a view illustrating the injection of the preservative solution into the cranial cavity of an animal.

It is essential that all parts of the animal body be injected with the preservative solution. Care should be taken to inject the solution along the length of the spinal column and tail. The brain cavity should also be injected. This can be accomplished in a variety of ways depending in part upon the size of the animal. For small animals the syringe needle can be inserted through the eye socket into the brain. Intermediate sized animals such as rabbits and the like can be injected through the base of the skull. To inject through the base of the skull, the animal is held in one hand with the head 20 of the animal 12 bent forward as shown in FIG. 2. This will cause the cervical vertebrae to separate from the base of the skull, creating a small depression. The needle of the syringe 10 can then be inserted into the depression through the Foramen magnum and into the cranial cavity. The cavity can thus be completely saturated with preservative.

When handling larger animals, it is easier to drill a small hole slightly larger than the syringe needle in the top of the head or the base of the skull, whichever is least conspicuous. The syringe needle can then be inserted through the drilled hole to fill the cranial cavity and completely saturate the brain tissue. After the cavity has been filled, the hair around the small drilled hole can be combed to hide it.

The preservative solution includes, in a preferred form, formalin, a formalin neutralizer, a dehydrating agent, an odorant, and a mold inhibitor. The formalin is an aqueous solution of formaldehyde, preferably 40% by volume formaldehyde. Such solutions are standard and can be purchased on the open market. An exemplary solution is identified as "Formaldehyde N.F." and is available from W. H. Curtin, 1812 Griffin Street, Dallas, Tex. When formalin is referred to herein, it is intended to mean an aqueous solution of formaldehyde. The formalin penetrates the body tissues and aids in preservation thereof. To a certain extent, the formalin also progressively hardens the body tissues.

The formalin neutralizer is added to the preservative solution to lessen the odor of formaldehyde. An exemplary formalin neutralizer can be purchased from Carolina Biological Supply, Burlington, N.C., as described in their 1969–70 catalogue no. 40, page 820.

The dehydrating agent aids in removal of water from the animal tissue. A preferred dehydrating agent is one chosen from the lower aliphatic alcohols, preferably those with six or less carbon atoms. A most preferred dehydrating agent is a 70 percent by volume aqueous solution of isopropyl alcohol. This alcohol is preferred over other alcohols since it causes less shrinkage, more easily penetrates body tissues, is more readily available and relatively inexpensive.

The odorant can be added to the preservative solution to aid in masking the odor of formaldehyde. It is not necessary but is present for its aesthetic value. A preferred odorant is bay rum in an alcohol solution. An exemplary bay rum can be obtained under the tradename "Purepac," available from Purepac Company, Elizabeth, N.J.

In humid climates, the addition of a mold inhibitor to the preservative solution is preferred. In such climates mold on an animal is caused by the fact that preserved tissue will absorb water, providing a medium for mold growth. The presence of a mold inhibitor in the preselective solution is not necessary for dry climates where the development of a mold culture on a finished animal is not likely. A variety of mold inhibitors are available. A preferred inhibitor can be purchased in powdered form under the tradename "Moldex" from General Biological Supply Corporation, 8200 S. Hoyne Avenue, Chicago, Ill. Another suitable mold inhibitor is copper sulfate. The latter should be handled carefully since it is poisonous.

The preservative solution can contain from 66% to 80% of a 40% aqueous formaldehyde solution, from 1% to 2.5% of a formalin neutralizer, and from 8% to 20% of a lower aliphatic alcohol. In a more preferred embodiment, the preservative solution can also contain from 6% to 13% of an odorant and from 1% to 5% of a mold inhibitor. It has been found that a preservative solution containing about 73.5% of a 40% by volume aqueous formaldehyde solution, 2.3% formalin neutralizer, 13.8% alcohol, 9.2% odorant, and 1.2% mold inhibitor will give excellent results. All percentages used herein are by volume unless otherwise specifically noted.

While completely saturating the primary portions of the body of the animal with preservative solution, care should be taken not to inject the solution into the ears. This will increase the drying time of the ears. Because of the shape of the ears, they tend to dry rapidly which will cause them to wrinkle to some extent. Rapid drying should therefore be avoided if possible.

Figure 3:
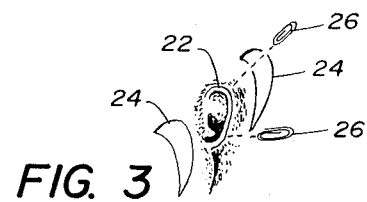
FIG. 3 is a view of the preservation technique as applied to small animal ears.

If the animal being preserved has small ears, two forms are made, for example from cardboard, which nearly conform to the size of the ear are prepared. The ears 22 (as shown in FIG. 3) can then be positioned as desired with a cardboard form 24 positioned on each side of the ear and thereafter attached to the ear to hold it in place and prevent wrinkling. A paper clip 26 or other suitable fastener is utilized to connect the forms 24 to the ear 22. Care should be taken not to form noticeable indentations in the ear with the fastener since such indentations will remain when the ears dry. The form is left in place until the ear is completely air dried. If the drying process progresses too slowly, the ears can be saturated from the exterior with alcohol or an aqueous alcohol solution. This will hasten the drying process. If the ears begin to dry too fast and thus begin to wrinkle, the drying process can be lengthened by rubbing the ears with a mineral oil. This will slow down the drying process and help remove some wrinkles which have formed.

Figures 4, 5:
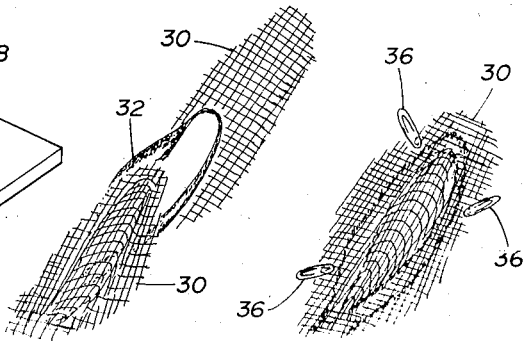
FIGS. 4 and 5 are sequential illustrations of the preservation technique for large animal ears.

Referring now to FIGS. 4 and 5, the method for handling large ears, such as those found on a deer, will be described. Two forms 30 slightly larger than the ear 32 of an animal are prepared from wire screen material. It has been found that aluminum screen wire is excellent for this purpose. The forms 30 are then fitted to the ear and shaped to conform to the natural contour of the ear as shown in FIG. 5. The wire screen is then attached to the ear 32 by suitable fasteners such as clips 36. The wire screen can also be temporarily sewn together with needle and thread. The forms 30 will hold the ear in place until it becomes rigid and can support its own weight after drying. After the ear has been positioned and attached to the wire form, it is handled in the same manner as the smaller ears described above.

Figure 6:
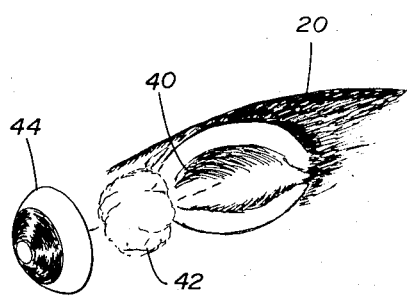
FIG. 6 is an illustration of the technique utilized for insertion of artificial eyes into the eye socket of an animal.

After the ears are connected to forms, attention is directed to preparation of the eyes. All eye tissue should be removed from the eye socket 40 (FIG. 6). The sockets are then washed with the preservative solution. This can easily be done by saturating a cotton swab with the solution and cleaning the socket. A mixture of potters clay or other substitute and water is then prepared. An exemplary proportion is 3 parts water to 4 parts clay. A cotton ball about the size of the eye socket is then rolled in the potters clay to produce a spongy ball about the size of the eye socket. Preferably an absorbent cotton is utilized so that it will become completely impregnated with the clay.

The cotton-clay ball 42 is then inserted into the eye socket 40 so that ball 42 fills the socket completely. Thereafter an artificial eye 44 is inserted into the socket. Cotton is seldom used. However, it has been found that the combination of the cotton and clay provides for easier insertion of the artificial eye. The eye is inserted by pushing it up under the upper lid, pulling down the lower lid with the other hand until it clears the bottom of the eye, and allowing the eye to slip into place. The combination of cotton and clay will depress with pressure but will expand after the eye is in place to hold the eye more naturally.

A small sharp instrument can be utilized to move the eye into desired position. It is necessary to coordinate both eyes so that they are looking in the same direction. Excess clay and cotton which has oozed from around the edges of the eye can then be removed. If the artificial eye bulges too much from the socket or if it is recessed too far, it can be removed from the socket. The cotton-clay packing can be removed or inserted as the particular situation dictates.

After the animal is fully injected with the preservative solution, it will begin to stiffen due to mild coagulation of the protein and hardening of other tissues. This will occur relatively quickly. For example, after forming the ears and preparing the eyes, noticeable stiffening will have taken place. While preparing the eyes and ears, a check is maintained on the progress of the stiffening. If the animal is becoming too stiff to manipulate, the eye and ear procedures should be suspended to position the animal in its display form, after which the eye and ear procedures can be resumed and finished.

Figure 7:
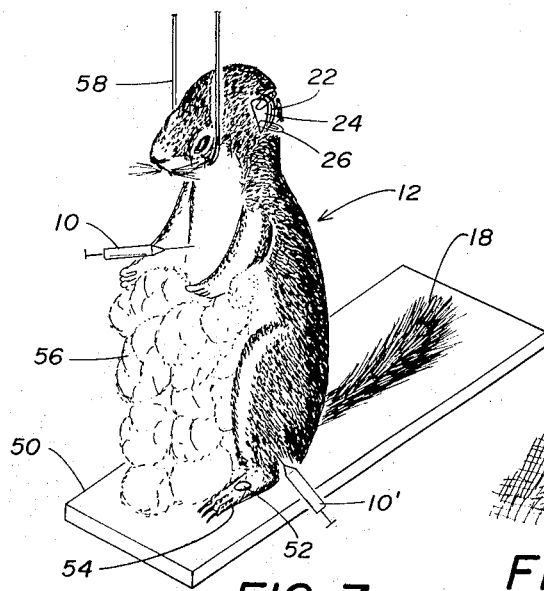
FIG. 7 is a view illustrating the mounting of an animal to a display board and forming of its display shape.

The animal is positioned by placing the feet in a position desired for final display. The choice of display position is dependent upon the type of animal and the artificial habitat in which the animal will be displayed. In the embodiment described herein, display on a board 50 is shown (FIG. 7). Aluminum finishing nails 52 are utilized to attach the feet 54 to the display board 50. Aluminum nails are preferred since they do not rust and will not discolor the animal.

The animal should be positioned naturally. Cotton wads 56 are utilized to prop the body 12 and support it in a desired position. In conjunction therewith, the animal can be tied to a suitable support with twine 58. When twine is used, the points of contact between the twine and the body should be padded with cotton to prevent indentation of the animal skin. Care should be used to prevent any undesired indentations since upon death, animal skin looses its elasticity. Creases or other marks made in the skin will remain and are very difficult and sometimes impossible to remove.

When the animal is in its desired display position, injections of a setting agent are initiated. Injections of the setting agent are made in substantially the same manner as are the preservative solution injections. Injections of the setting agent are begun in the midsection of the animal. Subsequent injections are made successively nearer the extremities of the animal.

The abdominal area and all other cavities, tissues and muscles are injected with the setting agent. The cranial cavity is also injected with setting agent as it was with preservative solution. Care must be taken not to overfill the animal since the skin can be stretched and distorted. Injections with a syringe 10 such as shown (FIG. 7) must be made with care. The plunger of the syringe should be operated with a slow steady push. Slow injection of the setting agent allows it to permeate the tissues and seek the voids in the animal. Injections made too rapidly will cause lumps to occur under the skin of the animal. If the latter inadvertently happens, injection of the setting agent is stopped and the lump is removed before it hardens. The lump can be removed by using the heel of the hand to knead the lump away. After injection of the setting agent is complete, the body of the animal is manipulated by hand to work the setting agent around inside the body to insure even distribution.

The setting agent preferably used in practice of the present invention is a combination of calcium sulfate (commonly known as plaster of paris), sodium chloride and water. Any cementitious material can be utilized as well as any other suitable substitute therefor as long as the substitute is not heavy relative to the preferred mixture and does not have a deleterious effect on the animal tissue. When combined with calcium sulfate, sodium chloride acts as an accelerator to hasten the chemical reaction causing the calcium sulfate to harden and thus provide form to the animal. Care is taken not to use excessive sodium chloride since the calcium sulfate-water reaction is exothermic. If too much accelerator is utilized, excessive heat will be produced causing damage to the tissue and hair of the animal. A ratio of 1 part sodium chloride to 70 parts by weight calcium sulfate will maintain heat evolution within acceptable bounds. For the first injections described above, a medium consistency mixture in the range of from 1.5 to 2 parts water per part plaster has been found to be satisfactory.

After this first series of injections of the setting agent have been made, a second mixture of setting agent is prepared. Preferably, the second agent has a heavier consistency than that of the medium consistency mixture utilized above. An exemplary heavy mixture is 3 parts water to 4 parts plaster. The heavy mixture is injected into all body openings to prevent further egress of preservation solution and setting agent. The setting agent should be injected deeply enough into the body opening so that it cannot be seen from the exterior of the animal.

The heavy mixture, or one of yet still slightly greater consistency, is utilized thereafter to inject all joints of the animal which will support the body. This procedure is shown in FIG. 7 wherein syringe 10' is illustrated injecting leg joints of the animal 12. After injecting the joints, it is also necessary to inject the spinal area to ensure support of the abdominal area. After these injections have been completed, excess setting agent should be washed from the exterior of the animal with water or other suitable washing agent before it sets.

At this point, the only remaining procedure in the first step is positioning and care of the mouth of the animal. For most displays, it is desirable that the mouth be in a closed position. It is preferable to secure the mouth in a closed position since as the tissue near the edges of the mouth dehydrates, it will sometimes droop and will slightly shrink, thus giving an unnatural look. To close the mouth, a sewing thread of the same color as the edges of the mouth is utilized to sew the mouth shut with a whipping stitch.

If the mouth is to be left open, the tongue is positioned naturally. The throat area is plugged with a medium consistency plaster mixture. An animal tongue, after death, is relaxed and may be longer than it ordinarily would be. Therefore, it may be necessary to push the tongue back into the throat area to obtain a more realistic look. If the mouth is to be left open, the teeth should be scrubbed with a bicarbonate of soda and salt solution to clean and brighten them. The mouth tissue and gums are injected with the preservative solution as was the rest of the body. Thereafter, the mouth is filled with cotton wads until it is in the desired position. Care must be taken not to displace the tongue when positioning the mouth.

The mouth tissue will not retain all of its original natural color. Therefore, it will be necessary to paint portions of the inside of the mouth at a later time to restore a natural look. Careful note should be taken of the colors in the mouth so that final painting will be accurate.

After all injections have been completed and the eyes, ears and mouth have been cared for, the animal in its supported position should be placed in a protected, well ventilated place to dry for a period of approximately 24 hours. The animal should not be allowed to dry too rapidly. The drying process can be retarded by covering the specimen with damp paper towels or the like. The first step of the present invention is completed.

Figure 8:
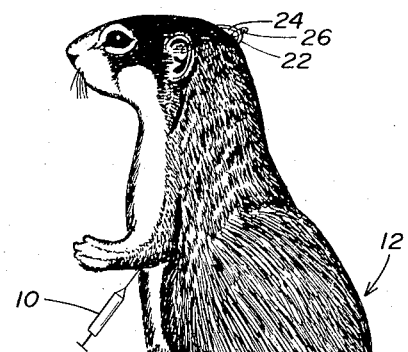
FIG. 8 is a view of the animal mounted on a display board, wherein injections are being made to critical support points of the body.

After waiting for about 24 hours, the animal can be removed from the drying area and returned to a work area to begin the second step of the invention. At this time, all supports including cotton and/or twine can be removed as shown completed in FIG. 8. If the animal has been properly injected it will be sufficiently rigid to hold the position into which it has been placed. The cotton wadding can also be removed from the mouth. The tongue should be checked to assure correct positioning. If the mouth structure appears abnormal, the tissue can be moved and held in place temporarily by straight pins. At this point also, the supporting joints of the animal should be checked to see if any are moveable. If any are moveable, they should be reinjected with a heavy consistency setting agent at the joints as illustrated in conjunction with syringes 10 and 10'.

Another quantity of a medium consistency setting agent is then prepared. It is injected into any soft spots in the body. If the cotton wadding has caused areas of the body to be flattened, these areas can be carefully filled with the medium consistency setting agent, thus making them appear more natural. Caution should be taken to knead setting agent injections to prevent lumping. The creation of distorted or distended body areas can be prevented by conservative injection of the setting agent. The setting agent should then be allowed to harden. In the preferred embodiment utilizing a mixture of 1 part plaster of paris to 1½ to 2 parts water, the will take about 15 minutes or longer depending upon atmospheric conditions.

Thereafter, the animal is reinjected with the preservative solution. If the mouth is open, the mouth tissues should also be reinjected. Successive injections are made as if the animal had not been injected before. All tissues must again be saturated. Any plaster that has seeped into the hair through the skin can be washed away with water.

Next a skin preparation composed of powdered alum (aluminum potassium sulfate) is rubbed into the saturated skin to obtain the full effect of the skin preparation. It should be contacted with all the body hair and skin of the animal. The skin preparation will cause the hair follicle to close around the base of the hair which will prevent the hair from falling out and it will also prevent any hair slippage.

The ears must be checked to assure that they are drying without wrinkling. If need be, the cardboard from and clip or the screen wire can be adjusted to prevent indentations. The hair preparation should be rubbed through the wire or onto the ear into the hair on the ears.

When the second step above is finished, the animal is again placed in a well ventilated, protected area to dry. The animal should be allowed to dry for a period of about 24 hours.

After the animal has dried for about 24 hours, the third step of the invention is initiated, repeating all the procedures of the second step. In this step a setting agent of light consistency is utilized. Preferably, the plaster of paris composition is mixed in a proportion of about 1 part calcium sulfate to 2 to 2.5 parts water. The setting agent is injected just beneath the skin of the animal to fill out the body shape. The tissue of the facial area must be injected along with the rest of the body, or it will dry and wrinkle, thus looking unnatural. Likewise the underside of the lower jaw should not be neglected. The setting agent can be kneaded to prevent lumping as before. Excess setting agent which has seeped into the hair is removed by washing.

Thereafter, a skin saturating solution is preferably prepared in the following proportions: ½ ounce of powdered aluminum potassium sulfate, ⅛ ounce of "Calorax," ⅛ ounce of mold inhibitor, and 3 ounces of a 40% aqueous solution of formaldehyde. Calorax is a commercially available insect repellent which can be purchased from J. W. Elwood Supply, Omaha, Nebraska. The mold inhibitor is the same as that described above. An acceptable range of ingredients for the skin saturating solution for alum, Calorax, mold inhibitor, and formalin solution are, respectively, 4-8:1-6:1:12. The skin and hair of the animal are then saturated with the solution. Preferably, a syringe with small needle is utilized to inject the solution into the skin itself. After the skin has been completely saturated, the animal is again placed in a well ventilated, protected area to dry for a period of about 24 hours. Thus the third step is completed.

After the third drying period, the procedures of the third step are repeated to initiate the fourth step. For best results, powdered potassium aluminum sulfate can be rubbed into the hair after repeating the third step. If the animal is larger than a raccoon (Procyon lotor) it may be necessary to repeat the procedures of the fourth step as a fifth step to insure proper molding and preservation of the animal.

After completing the fourth step, the animal is allowed to completely dry in a well ventilated, protected area. If the procedures of steps one through four have been properly completed, the specimen at this time will be completely hard with no soft spots. If any soft spots still remain, they can be filled with a medium consistency setting agent at this time. All excess setting agent should then be washed from the hair. The hair can then be brushed into natural patterns.

Final preparation of the animal includes a hair grooming, painting of exposed dark areas such as foot pads, and painting of the mouth if it is open.

A hair grooming solution is prepared from a mixture of 9 parts to 18 parts (depending on oil content of hair) by weight bay rum with one part mineral oil. After the two ingredients have been mixed well, the grooming solution is rubbed into the hair. The hair can then be rebrushed to make it look natural. The grooming solution replaces the natural oils which have been washed away by the preservative solution and repeated water washings to give the hair a lively natural luster. Similar results can be obtained by suitable substitutes such as a greaseless hair grooming formula. A lanolin based grooming spray is also an excellent substitute.

Dark exposed areas such as the foot pads, nose and edges of the eye lids will have faded somewhat during the preservation and forming steps. These areas are painted with a mixture of ½ ounce lamp black and ½ ounce of turpentine to restore natural colors. Any excess clay that has been forced out around the edges of the glass eye is wiped away. Any remaining exposed clay around the eye socket is painted black.

If one has chosen to leave the mouth open, it can now be painted. As mentioned above, notes as to the natural colors of the mouth should be taken shortly after the animal is killed. These notes are a valuable reference when restoring the natural colors of the mouth. Some of the natural color will remain in the mouth and can be used as a guide. Best results in painting the mouth are obtained by preparing a wash, which is a very thin mixture of paint and a paint thinner.

After the painting is finished, the animal is again placed in a well protected, ventilated area to dry for a period of about 24 hours. After the animal is dried, the grooming and painting procedures are repeated as necessary. Minor corrections in position, filling, coloring and the like are made at this time. After the animal has again dried thoroughly, the ear supports can be removed. At this time, the grooming solution is utilized on the ears as well as rubbed onto the body again. After the animal has been groomed, the hair combed in place and a natural look achieved, the entire animal, except for the eyes, is sprayed with a clear lacquer, such as that commonly known as hair spray.

If desired, a habitat can be constructed for display of the animal. Artistic ingenuity should be used at this point. It goes without saying that the habitat should be natural for the animal being mounted. For example, tree branches fastened to a wooden base are suitable for tree dwelling animals. Burrows, nests and lairs can be recreated with sticks and rocks worked together with paper mache and paint. Though the habitat forms no part of the present invention, it enhances the aesthetic value of the mounted animal for final display.

The present invention can be modified for use in making head mounts of animals, for mounting fowl and for mounting reptiles, amphibians and fish.

In many instances, one desires only to mount the head of an animal. Such head mounts can be prepared in the same manner as described for an entire animal above, observing a few modifications of the above procedures. The animal head is removed from the animal at a point along the neck about two inches longer than the desired length of the final mount. Muscle and bone from the two inch excess is then removed. This provides a skin flap around the severed end of the animal.

A wooden plug in the shape of the severed edge of the animal is prepared. The plug is inserted into the cut area, and the two inch excess of skin flap is wrapped around the rear of the plug. The skin flap is tacked to the rear of the wooden plug, utilizing common upholstering techniques. It may be necessary to longitudinally slit the skin flap in a few places to prevent puckering around the edges of the plug. Preferably, large aluminum tacks are utilized to secure the skin in place. Care is taken when inserting and tacking the plug to keep the head in a natural position, keeping in mind that the plug will most probably be mounted vertically on a plaque. Once the plug is properly positioned and tacked to the head, the preservation procedures described above for the whole animal are followed. The head is treated in the same manner as if the animal were whole.

Care must be taken with respect to the eye socket of large animals. After the first series of injections of preservative solution and setting agent, the eye socket of large animals becomes very hard and stiff. It is therefore imperative that the artificial eyes are positioned as soon as possible. If there is any delay, it becomes virtually impossible to position the eyes in a hardened socket.

As described in conjunction with FIGS. 4 and 5 above, large ears will require forms from screen wire or the like. For ears as large as those found on a deer, it may be necessary to use a double thickness of screen wire on each side of the ear in order to provide sufficient support for the ears.

If the animal head to be mounted has antlers as distinguished from horns, they should be cleaned with a suitable solvent such as white gasoline to remove any blood and/or debris. Similar results can be obtained by using a conventional scouring powder and water. The natural color of the antlers can be restored by dissolving a small amount of potassium permanganate in hot water and applying the solution to the antlers. Several applications of the potassium permanganate solution may be required to restore natural color. The potassium permanganate solution should not be contacted with the hair, particularly at the base of the antlers or discoloration thereof will result. After the animal has been completed, a light coat of mineral oil applied to the antlers will give them a natural sheen. If the animal has horns instead of antlers, they should not be oiled since horns are not porous.

As the nose area of a larger animal dries, it begins to noticeably wrinkle. This wrinkling can be prevented by using a relatively thin solution of setting agent injected into the nose area to fill it out. The nose area should be checked as each procedure is conducted and setting agent injected as necessary to prevent this wrinkling. When the head is complete, it can be mounted on a suitable wooden base using wood screws through the back of the base into the wooden plug attached to the head.

The same basic techniques described in relation to a whole animal can be utilized for fowl, observing the following modifications for best results. It should be recognized that the body of a bird is deceptively smaller than it appears with feathers on it. Therefore, the preservative and setting agent material should be used conservatively.

The preservative solution is injected only from the abdomen side of the fowl. Care is taken to prevent the preservative solution from contacting the feathers, as it may cause an unnatural look when dry. Inject only a small quantity of the setting agent into the body. All joints should be injected carefully, immediately wiping away any setting agent that leaks from the joints with a damp cloth.

The major variation from the whole animal procedure regards the legs of the fowl. Since the legs of fowl are relatively fragile and small, the procedures described above will not provide sufficient stiffening and support in the legs to completely support the body of the fowl. This problem can be alleviated since the legs of all fowl are covered with scales. These scales can be fused together to provide the necessary strength and support for the body of the fowl. The legs can be fused by the following procedure. Stretch the legs by holding them at the body and pulling the foot. This will separate the scales in the leg. Insert an epoxy glue or other suitable adhesive into the spaces behind the separated scales. Thereafter, push the leg into its normal position, wiping away excess glue squeezed from between the scales. After the epoxy glue has hardened, a strong sheath is provided for support of the outside of the leg.

The same basic technique described in conjunction with a whole animal can also be utilized to preserve reptiles, amphibians and fish. The major difficulty with this type of animal is that it tends to lose its color during the preservation operation. At the present time, the best solution to this difficulty is notation and recordation of the original colors soon after the animal has been killed. After the preservation technique is completed, the animal can be painted with a wash to obtain the original coloration of the animal.

The fins of fish can be treated in the same way as the ears of an animal. The fins are positioned as desired with card-board and/or pins. As the fins dry, they will become stiff and hard and will retain the position in which they were originally placed. Additional support and shape can be obtained by gluing a piece of thin plastic, preferably transparent, to the back side of the fin and trimming it to shape. The fin is then painted and sprayed with a lacquer.

After an animal of this type has been completely preserved in accord with the procedure disclosed herein, it can be fastened to a mounting board or base by using wood screws through the back of the base extending into the body of the animal.

The present invention has been described in accord with a preferred embodiment of preserving an animal. Various modifications have been described with respect to mounting of heads, preservation of fowl, and preservation of reptile, amphibians and fish. Other modifications, substitution of equivalents, alterations in the technique, and other changes will be recognized by those of ordinary skill in the art. It is intended, however, that the invention disclosed herein be limited only by its concept as defined in the appended claims.

What is claimed is:

1. A taxidermy method for preserving an animal body in a lifelike attitude for display in the atmosphere without requiring evisceration comprising:
   injecting a preservative solution into the entire area of the body of an animal before substantial decadent bacterial action has begun,
   allowing the preservative solution to react with the body tissue for a predetermined period of time, thereafter repeating the injection of the preservative solution, and
   injecting a setting agent comprising plaster of paris, sodium chloride and water into the entire area of said body,
   posing and supporting said body in a lifelike position, and
   repeating the injection of said setting agent and allowing said setting agent to stiffen and form said body in the desired position so that the stiffened body may be displayed in the atmosphere in a lifelike natural state.

2. The method of claim 1 wherein a plurality of said injections are made in a relatively short time beginning in the midsection of said body, successive injections of said plurality of injections being made generally at positions along said body nearer the extremities thereof.

3. The method of claim 1 wherein said skin saturating solution comprises:
   alum,
   an insect repellent,
   a mold inhibitor, and
   an aqueous formaldehyde solution.

4. The method of claim 1 wherein said preservative solution comprises:
   an aqueous formaldehyde solution, and
   a lower aliphatic alcohol.

5. The method of claim 4 wherein said preservative solution further comprises:
   a formalin neutralizer, and
   a mold inhibitor.

6. The method of claim 5 wherein said preservative solution further comprises:
 an odorant.

7. The method of claim 1 wherein said preservative solution comprises, by volume percent:
 6% to 80% of a 40% by volume aqueous formaldehyde solution,
 1% to 2.5% of a formalin neutralizer,
 8% to 20% of a lower aliphatic alcohol,
 6% to 13% of an odorant, and
 1% to 5% of a mold inhibitor.

8. The method of claim 7 wherein said preservative solution comprises, by volume percent, about:
 73.5% of a 40% by volume aqueous formaldehyde solution
 2.3% formalin neutralizer,
 13.8% alcohol,
 9.2% odorant, and
 1.2% mold inhibitor.

9. The method of claim 1 and further comprising:
 rubbing a skin saturating solution onto the skin of said animal.

10. The method of claim 9 whereinafter the method further comprises:
 rubbing a combination of an odorant and a mineral oil onto the skin of said animal.

\* \* \* \* \*

PO-1050
(5/69)

UNITED STATES PATENT OFFICE
CERTIFICATE OF CORRECTION

Patent No. 3,780,452          Dated    December 25, 1973

Inventor(s) William D. Jackson

It is certified that error appears in the above-identified patent and that said Letters Patent are hereby corrected as shown below:

Col. 8, line 26, "the" should be --this--;
Col. 13, line 6, "6%" should be --66%--.

Signed and sealed this 9th day of April 1974.

(SEAL)
Attest:

EDWARD M. FLETCHER, JR.            C. MARSHALL DANN
Attesting Officer                     Commissioner of Patents